US005455965A

United States Patent [19]

Shaughnessy et al.

[11] Patent Number: 5,455,965

[45] Date of Patent: Oct. 3, 1995

[54] METHOD FOR DETERMINING AND UTILIZING SIMULCAST TRANSMIT TIMES

[75] Inventors: Mark L. Shaughnessy, Algonquin; Richard Ng; Gary W. Grube, both of Palatine, all of Ill.

[73] Assignee: Motorola, Inc., Schaumburg, Ill.

[21] Appl. No.: 68,874

[22] Filed: May 28, 1993

Related U.S. Application Data

[63] Continuation-in-part of Ser. No. 023,536, Feb. 26, 1993.

[51] Int. Cl.$^6$ .......... H04B 1/00

[52] U.S. Cl. .......... 455/51.2; 455/67.6

[58] Field of Search .......... 455/33.1, 33.4, 455/51.1, 51.2, 56.1, 67.6; 375/107

[56] References Cited

U.S. PATENT DOCUMENTS 5,201,061 4/1993 Goldberg et al. .......... 455/51.2

*Primary Examiner*—Reinhard J. Eisenzopf
*Assistant Examiner*—Mary M. Lin
*Attorney, Agent, or Firm*—Timothy W. Markison; Nedra D. Karim; James A. Coffing

[57] ABSTRACT

Determining transmit time of a received signal in a simulcast multi-site communication system begins when a communication unit transmits a message to one or more network receivers. Each receiver transports the received signal with a time stamp to each transceiver in the network via a digital communication network. Each transceiver calculates a wait period, during which, the transceiver may receive the signal and time stamp message from another receiver. Once the wait period expires, each transceiver, using a substantially similar selection method, selects the same received signal to broadcast. Each transceiver then determines a launch time for transmission of the selected received signal, wherein the launch time accommodates the worst case expected transport delay through the digital network.

8 Claims, 4 Drawing Sheets

METHOD FOR DETERMINING AND UTILIZING SIMULCAST TRANSMIT TIMES

This is a continuation-in-part of co-pending patent application having a filing date of Feb. 26, 1993, U.S. Ser. No. 08/023,536, and is entitled "Simulcast Group Determination of Best Signal".

FIELD OF THE INVENTION

This invention relates generally to communication systems and, in particular, to simulcast communication systems.

BACKGROUND OF THE INVENTION

The basic operation and structure of land mobile radio communication systems are known. Such radio communication systems typically comprise a plurality of communication units (vehicle mounted or portable radios in a land mobile system and radio/telephones in a cellular system), a predetermined number of transceivers, which are located throughout a geographic region and transceive information via communication channels, and a controlling entity. The controlling entity may either be a centralized call processing controller or it may be a network of distributed controllers working together to establish communication paths for the communication units. The communication channels may be time division multiplex (TDM) slots, carrier frequencies, a pair of carrier frequencies or other radio frequency (RF) transmission medium. A frequency or time portion of one or more of the communication channels may be established for call control purposes such that a communication unit may communicate with the system controller to request and receive system resources.

Multiple site communication systems which comprise a plurality of repeater and transceivers that are distributed throughout a large geographic region are also known. In such systems, communication units of a particular talk group may be located anywhere in the multi-site coverage area. To establish a group call, the multi-site system must be able to quickly and efficiently set-up communication paths, or inter-site links, between all the sites, or between just those sites having a member of the particular talk group located within it. One method of establishing the communication links is simulcast. Simulcast uses the same communication channel (or carrier frequency) in each site for the particular group. This is an efficient frequency reuse technique when members of the particular group are routinely located throughout the multi-site system.

A typical transceiver in a simulcast multi-site communication system comprises an individual circuit that couples the transceiver to a central radio system audio collection and distribution point (prime site). Each transceiver receives signals on the same frequency and transports the signals to the single audio collection point where a single signal comparator selects the best signal from all the sites. (Note that a site in the multi-site system may contain a transceiver (transmitter and receiver) or only a receiver.) The signal selected as the best is distributed from the centralized point on links back to the transceiver sites for simultaneous re-transmission. To accurately re-transmit the best signal, dedicated, stable, and time-invariant links are used. For example, the links may be analog and/or digital microwave channels. Note that digital switching networks are not used as links because they are not time-invariant.

With the dedicated, stable, and time invariant links, the site transmitters can re-broadcast the best signal in phase, in time, and on the same frequency such that received signal distortion in overlapping site coverage areas is minimal. The stability of the links ensure that the resulting simulcasted signals remain within acceptable tolerances.

To account for the difference in the physical link transport time delays between the prime site and remote site transmitters, additional adjustable delay circuits are typically added to the links. The adjustable delay circuits compensate for the differences in physical link delay such that the total delay is the same at each transceiver site. Thus ensuring that the signal for transmission arrives at each transceiver site at the exact same time. The adjustable time delay devices added to the transmission distribution links may be at the prime or remote sites.

To accommodate for fluctuations in physical link delays, circuits have been devised to manually or automatically adjust the adjustable time delay circuits. However, it is difficult for simulcast systems to adapt to time changes while user traffic is in progress. Typically, the channel must be excluded from service while a closed loop test is performed to measure and adjust the delay.

Many users of a simulcast system need immediate and constant access to their system channels. For these users, disabling a channel for service is inconvenient at best and potentially catastrophic. Such is certainly the case for Public Safety users and centralized controller systems. In a centralized controller system, if the centralized controller is cut off from the system due to a channel being down, communication units cannot communicate. To avoid this, some systems include duplicate prime site equipment. The duplicate equipment involves added logic and switching functions which slows the switch-over process.

Therefore, a need exists for a multi-site simulcast communication system that can efficiently utilize time-invariant invariant or time-variant distribution links, be constructed without the delays of typical switching systems and that can instantly adapt to site failures and maintain the same constant grade of service while simulcasting transmissions.

DESCRIPTION OF A PREFERRED EMBODIMENT

Figure 1:
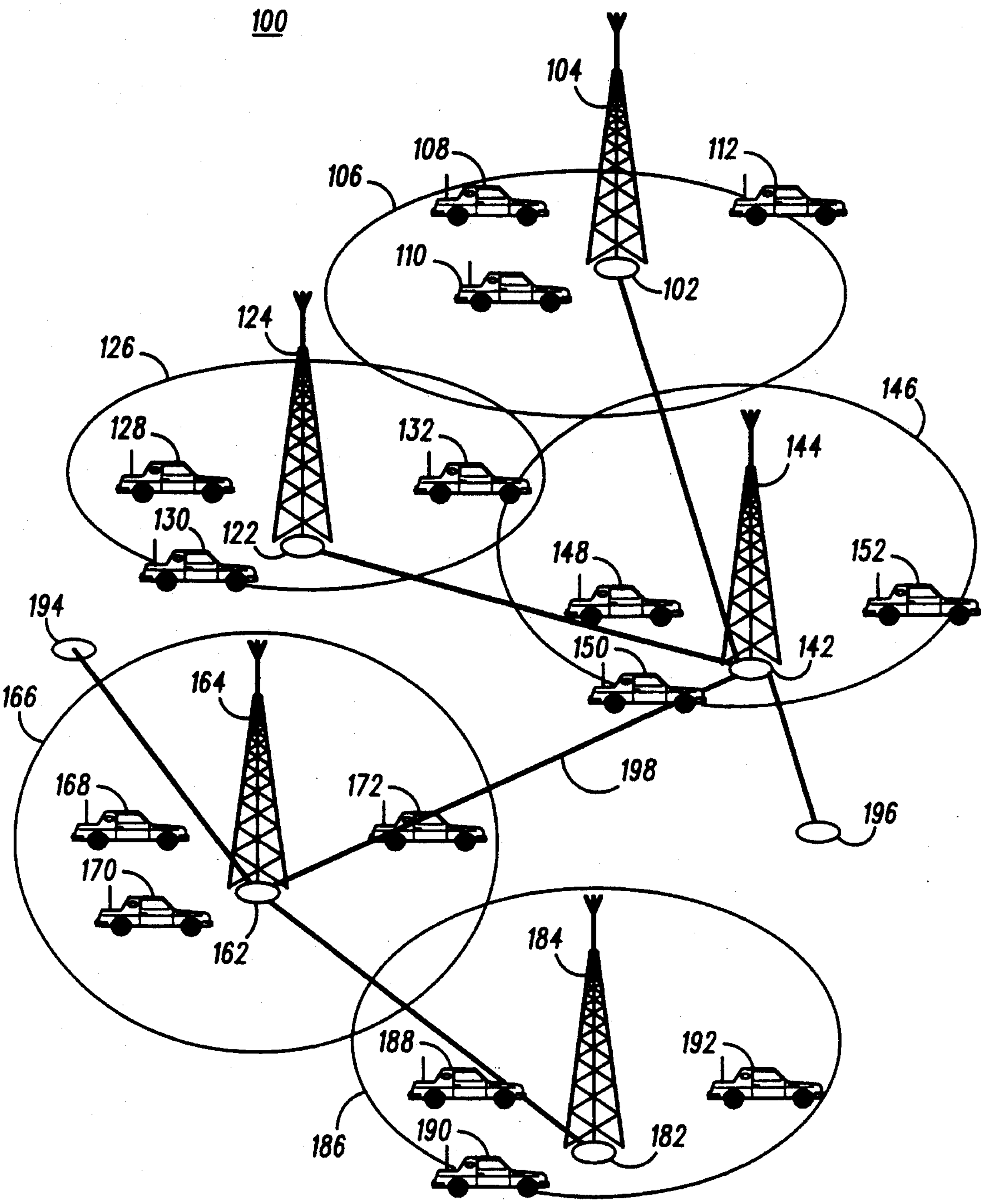
FIG. 1 illustrates a multi-site communication system that provides radio communication between communication units in accordance with the present invention.

FIG.1 illustrates a multi-site simulcast communication system 100 that comprises network nodes, or sites, 102, 122, 142, 162, 182, 194, and 196 (7 shown), vehicle mounted communication units 108, 110, 112, 128, 130, 132, 148, 150, 152, 168, 170, 172, 188, 190, and 192 (15 shown), repeaters 104, 124, 144, 164, and 184 (5 shown), and sites having respective coverage areas 106, 126, 146, 166, and 186 (5 shown). FIG. 1 depicts overlapping coverage areas of sites such that there is a seamless operating area. The sites are linked together in a non-star digital communication network 198, such that every site is connected to every other site, although not necessarily by a direct path. The typical star configuration of prior art simulcast systems is unnecessary although the present invention could be incorporated in a star configuration system. Further, some of the sites (102, 122, 142, 162, and 182) include repeaters to provide radio coverage areas, while other sites (194 and 196) do not. The sites without repeaters may be interconnected to consoles at dispatch centers which are not co-located at transceiver sites, or they may simply be composed of a single call processing controller. (Note that a repeater may include a transceiver, i.e. a receiver and transmitter, or just a receiver.)

Figure 2:
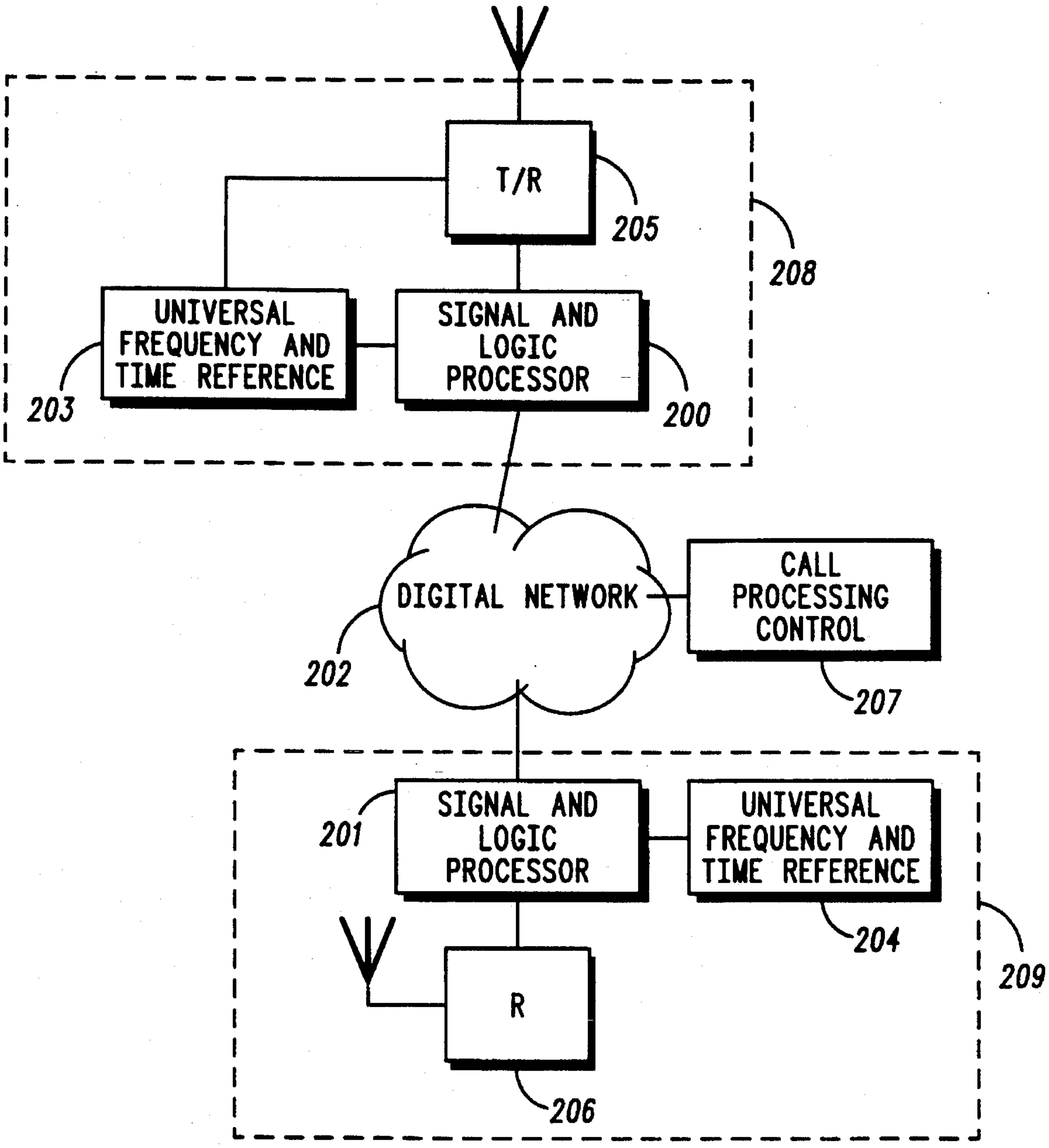
FIG. 2 illustrates a multi-site communication system that may incorporate the present invention.

FIG. 2 illustrates the same simulcast communication system as FIG. 1 but with a focus on site equipment coupled to the digital communication network. A first simulcast site 208, comprises at least one signal and logic processor 200, at least one transceiver 205, and at least one universal frequency and time reference 203. The signal and logic processor 200 may comprise an IntelliRepeater Station Control Board as manufactured by Motorola Incorporated. A second site 209 also comprises a signal and logic processor 201, a universal frequency and time reference 204 and a receiver 206. The first and second sites 208 and 209 are operably connected to all other sites via the digital communication network 202. The digital communication network carries both communication message payloads and control messages to establish communication. The digital communication network 202 may comprise time-variant delay links, such as those provided by public switching networks such as the public telephone switching network (PTSN). Often these type of links are provided with lower tariffs than those that are time-invariant, making them more attractive for use in simulcast communication systems. However, the links are often re-routed in these networks due to traffic overload or failures. The new route may take a completely different path through different links and switches, even through Earth orbit satellites, and thus have a significantly different delay.

At least one call processing controller 207 is operably connected to the digital communication network to direct call establishment activity. The call processing controller may comprise a central or zone controller as is known, or a communication resource allocator which is also known. Note that each radio network or sub-network must at least include one call processing controller at any network node to establish communication between two or more communication units and network users. Further note that there may be multiple call processing controllers at different nodes in the network such that each call processing controller takes responsibility for different sub-networks of the network, where a sub-network is any subset of the total network nodes. Still further note that there is no requirement that a call processing controller be responsible for the site at which it is located. For example, a network consisting of many nodes which are considered to encompass several sub-networks, may have all call processing controllers located at the same node.

Figure 3:
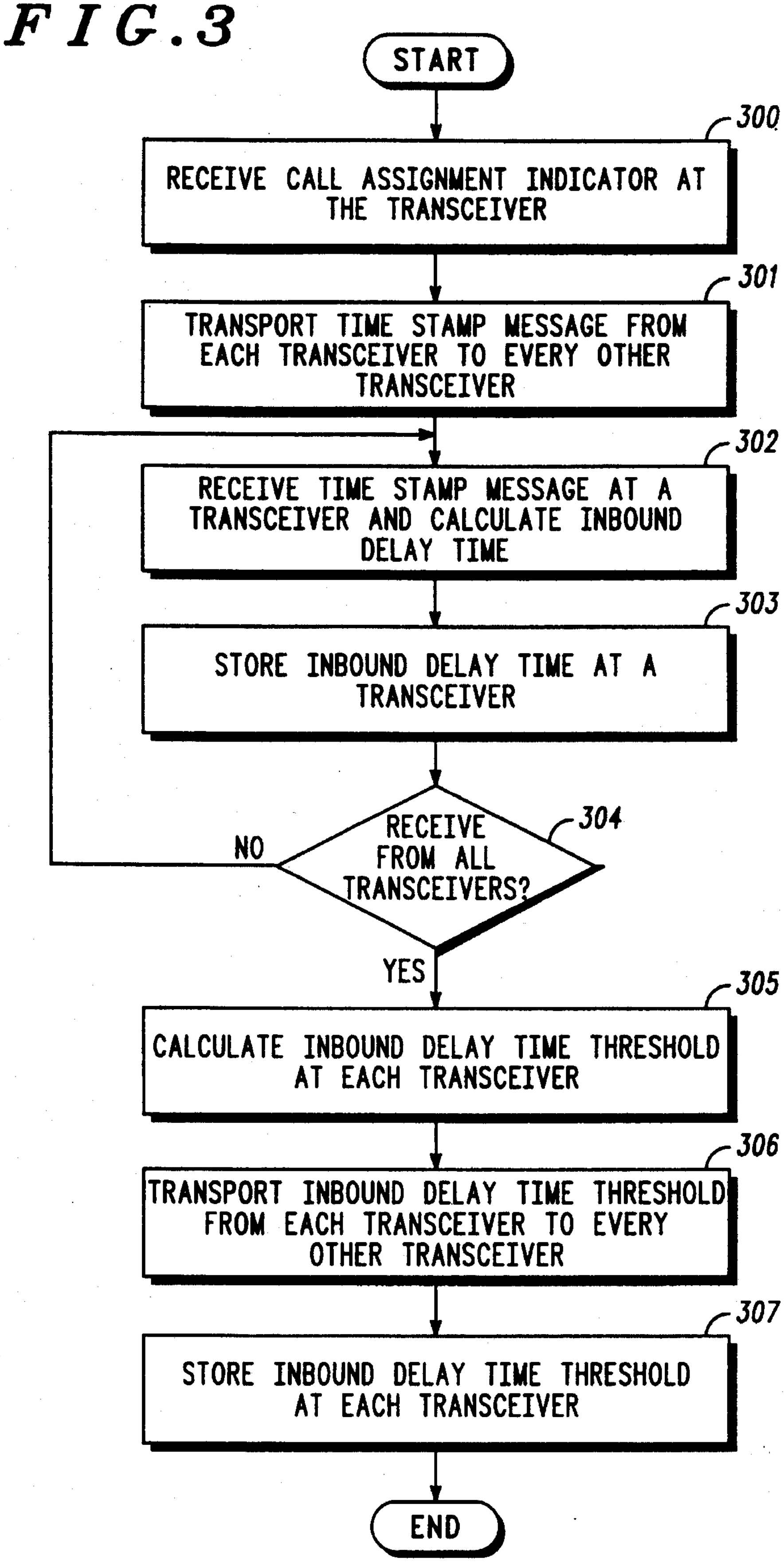
FIG. 3 illustrates a flow diagram that a transceiver may implement for processing a call assignment in accordance with the present invention.

FIG. 3 illustrates a flow diagram that a repeater may employ for processing a call assignment. (Recall that a repeater may include a transceiver, i.e. receiver and transmitter, or just a receiver.) The process begins when a repeater receives a call assignment indicator on the digital communication network (300). Once the call assignment indicator is received, the repeater transports a time stamp message onto the digital communication network (301) to be received by all other transceivers in the communication system. A repeater that includes just a receiver transports a receiver time stamp message onto the digital communication network. Hereafter, both the time stamp message and the receiver time stamp message will be referred to as the time stamp message. The time stamp message comprises a time stamp based on a universal time reference that is common to all transceivers and receivers in the communication system.

When the transceiver receives the time stamp message via the digital communication network, it calculates an inbound delay time for the receiver or transceiver that transported the message (302). The inbound delay time is a calculation of the time it takes information coming from the receiver or transceiver that transported the time stamp message to reach the transceiver that received the time stamp message. The inbound delay time is based on the time stamp message and when the message was received by the transceiver. For example, if the time stamp message has a time stamp of 00:00:01 and the message was received at 00:00:04, the calculated inbound delay time would substantially equal the time stamp–receive time of the message, or 00:00:04–00:00:01=00:00:03. The inbound delay time for each of the other transceivers and receivers that transported a time stamp message onto the digital communication network is stored by the transceiver (303). If a time stamp message has not been received from all transceivers and receivers (304), the transceiver continues to receive time stamp messages and calculate an inbound time delay from each message (302) and store the inbound time delay (303) until a time stamp message has been received from all transceivers.

Since link delay times can vary from time to time due to re-routing of the lines, the present invention takes into account the present configuration of the digital link at the start of the call assignment. When a time stamp message has been received from all repeaters (304) associated with the call assignment and corresponding inbound delay times have been calculated, each transceiver calculates an inbound delay time threshold (305). The inbound delay time threshold is derived from the stored inbound delay times calculated previously for each transceiver and receiver that transported a time stamp message. In one embodiment, the inbound delay time threshold is substantially equal to the worst case or greatest stored inbound delay time. As mentioned, since link delays can vary, the inbound delay time threshold could also vary from one call assignment to another. Each transceiver then transports it's calculated inbound delay time threshold onto the digital communication network to each of the other transceivers (306). Each transceiver receives the inbound delay time threshold from each of the other transceivers and stores it for later use (307).

Figure 4:
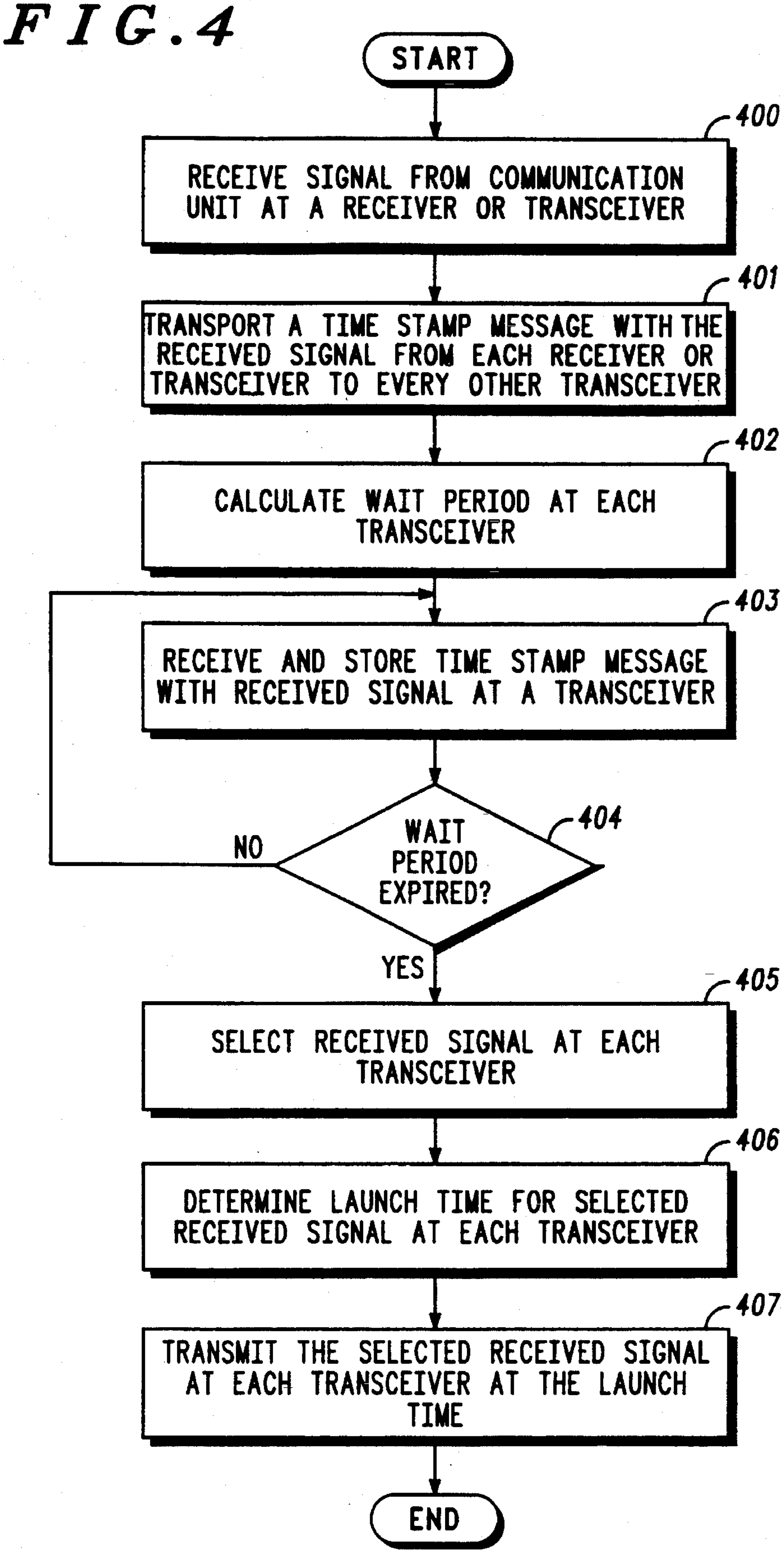
FIG. 4 illustrates a flow diagram that a transceiver or receiver may implement for processing received signals in accordance with the present invention.

FIG. 4 illustrates a flow diagram that a transceiver or receiver may employ for processing received signals. When a transceiver or receiver receives a signal from a communication unit (400), it transports a signal time stamp message along with the received signal to each of the other transceivers via the digital communication network (401). Each transceiver then calculates a wait period based on the stored inbound delay times for each receiver and transceiver (402). In one embodiment, the wait period is calculated to be substantially equal to the stored inbound delay time of the transceiver or receiver having the greatest stored inbound delay time.

Once the wait period is calculated, the transceiver receives and stores signal time messages along with received signals from other transceivers and receivers (403) via the digital communication network. While the transceiver waits for the wait period to expire (404), it continues to receive and store signal time messages and received signals from other transceivers and receivers that also received the signal from the communication unit (403).

When the wait period has expired (404), each transceiver selects the received signal to broadcast (405). The selection process is discussed in co-pending patent application having a filing date of Feb. 26, 1993, U.S. Ser. No. 08/023,536, and is entitled "Simulcast Group Determination of Best Signal". Each transceiver uses the signal time stamp message with the received signal to compare corresponding received signals. Also each transceiver utilizes the same selection method to insure that each transceiver selects the same received signal to broadcast.

After the received signal to broadcast is selected, the transceiver determines a launch time to transmit the selected received signal (406). In one embodiment, the launch time is determined to be substantially equal to the stored inbound delay time threshold of the transceiver or receiver having the greatest stored inbound delay time threshold plus time required for the transceiver to select the received signal to broadcast. Once the launch time is determined (406), each transceiver transmits the selected received signal at the launch time (407).

The present invention allows a group of two or more transceivers to receive a communication unit's transmission and re-broadcast that information on a same frequency simulcast carrier utilizing time variant links. The present invention accommodates time variant links by measuring outbound and inbound delays of the present configuration of the time variant links at the start of a call assignment. The measured outbound and inbound delay times are used in preparation of a simulcast transmission of the communication unit's transmission. The simulcast transmission is essentially in phase and on frequency so as to maximally utilize the efficiency of a single channel for a multi-site group dispatch communication. By not using a prior art star site configuration, the radio network is not susceptible to single site (prime site) failures thus providing a constant grade of service to the users, without the need for switching systems, without the need for duplicate systems, and without the need for time invariant distribution links.

We claim:

1. In a simulcast communication system that includes a plurality of sites, at least two transceivers, and a plurality of communication units, wherein each site of the plurality of sites includes at least one receiver, and wherein the plurality of sites are operably linked together by a digital communication network, a method for a first transceiver of the at least two transceivers to determine simulcast delay times of the digital communication network, the method comprising the steps of:

a) receiving an indication of a call assignment on the digital communication network to produce a call assignment indicator;

b) upon receiving the call assignment indicator, forming and transporting, by the first transceiver, a first time stamp message on to the digital communication network;

c) receiving, from at least a second of the at least two transceivers, at least a second time stamp message;

d) calculating, by the first transceiver, an inbound delay time for the at least second of the at least two transceivers, wherein the inbound delay time is based on the at least second time stamp message and a time when the at least second time stamp message was received;

e) storing the inbound delay time for the at least second of the at least two transceivers to produce stored inbound delay times;

f) calculating inbound delay time threshold based on the stored inbound delay times;

g) transporting the inbound delay time threshold to the at least second of the at least two transceivers; and h) storing the inbound delay time threshold.

2. The method of claim 1, further comprising the steps of:

i) receiving a receiver time stamp message from each of the receivers;

j) calculating, by the first transceiver, inbound delay time for each of the receivers, wherein the inbound delay time is based on the receiver time stamp message and a time when the receiver time stamp message was received; and k) storing the inbound delay time for each of the receivers.

3. In a simulcast communication system that includes a plurality of receivers, at least two transceivers, and a plurality of communication units, and wherein the plurality of repeaters and the at least two transceivers are operably linked together by a digital communication network, a method for a transceiver of the at least two transceivers to determine simulcast transmit time of received signals, the method comprising the steps of:

a) receiving, by a receiver of the plurality of receivers or transceiver of the at least two transceivers, a signal from a communication unit to produce a received signal;

b) transporting, by the receiver or the transceiver, the received signal and a signal time stamp message to each transceiver of the at least two transceivers via the digital communication network;

c) calculating, by each transceiver of the at least two transceivers, a wait period based on stored inbound delay times for each receiver of the plurality of receivers and each transceiver of the at least two transceivers, wherein each transceiver of the at least two transceivers waits for the duration of the wait period to receive the received signal from another receiver of the plurality of receivers or another transceiver of the at least two transceivers;

d) when the wait period expires, selecting, by each transceiver of the at least two transceivers, the received signal to broadcast to produce a selected received signal;

e) determining, by each transceiver of the at least two transceivers, a launch time based on stored inbound delay time threshold of each of the at least two transceivers; and f) transmitting the selected received signal by each of the at least two transceivers at the launch time.

4. The method of claim 3, wherein the step of calculating the wait period of step (c) further the step of calculating the wait period to be substantially equal to the stored inbound delay time of a transceiver of the at least two transceivers or a receiver of the plurality of receivers having the greatest stored inbound delay time.

5. The method of claim 3, wherein the step of calculating the launch time of step (e) further comprises the step of calculating the launch time to be substantially equal to the stored inbound delay time threshold of a transceiver of the at least two transceivers having the greatest stored inbound delay time threshold plus time required to produce the selected received signal.

6. In a simulcast communication system that includes a plurality of sites, at least two transceivers, and a plurality of communication units, wherein each site of the plurality of sites includes at least one receiver, and wherein the plurality of sites are operably linked together by a digital communication network, a method for determining simulcast delay times of the digital communication network, the method comprising the steps of:

a) receiving, by the at least two transceivers, an indication of a call assignment on the digital communication network to produce a call assignment indicator;

b) upon receiving the call assignment indicator, forming and transporting, by each of the at least two transceivers, a time stamp message on to the digital communication network;

c) receiving, by each of the at least two transceivers, the time stamp message from the at least two transceivers;

d) calculating, by each of the at least two transceivers, an inbound delay time for at least one of the at least two transceivers, wherein the inbound delay time is based on the time stamp message and a time when the time stamp message was received;

e) storing, by each of the at least two transceivers, the inbound delay time for at least one of the at least two transceivers to produce stored inbound delay times;

f) calculating, by each of the at least two transceivers, inbound delay time threshold based on the stored inbound delay times;

g) transporting, by each of the at least two transceivers, the inbound delay time threshold to at least one of the at least two transceivers; and h) storing, by each of the at least two transceivers, the inbound delay time threshold from at least one of the at least two transceivers.

7. The method of claim 6, further comprising the steps of:

i) receiving, by each of the at least two transceivers, a receiver time stamp message from each of the receivers;

j) calculating, by each of the at least two transceivers, inbound delay time for each of the receivers, wherein the inbound delay time is based on the receiver time stamp message and a time when the receiver time stamp message was received; and k) storing, by each of the at least two transceivers, the inbound delay time for each of the receivers to produce stored inbound delay times of each receiver.

8. The method of claim 6, wherein the inbound delay time is calculated for each of the at least two transceivers.

* * * * *